(12) United States Patent
Jung

(10) Patent No.: US 7,271,553 B2
(45) Date of Patent: Sep. 18, 2007

(54) DEFLECTION CIRCUIT TO CONTROL BASE CURRENT OF OUTPUT TRANSISTOR

(75) Inventor: Jae-wook Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/221,781

(22) Filed: Sep. 9, 2005

(65) Prior Publication Data

US 2006/0076909 A1 Apr. 13, 2006

(30) Foreign Application Priority Data

Oct. 13, 2004 (KR) .................. 10-2004-0081839

(51) Int. Cl.
*G09G 1/04* (2006.01)
(52) U.S. Cl. .............. 315/399; 315/403; 315/404; 315/405
(58) Field of Classification Search ........... 315/399, 315/403, 404, 405
See application file for complete search history.

(56) References Cited

U.S. PATENT DOCUMENTS 6,259,217 B1 * 7/2001 Song ........................ 315/387

6,323,606 B1 11/2001 Qian
6,686,929 B2 * 2/2004 Bang ........................ 345/698

FOREIGN PATENT DOCUMENTS

| JP | 06-27897 | 2/1994 |
|---|---|---|
| JP | 07-298084 | 11/1995 |
| JP | 10-79867 | 3/1998 |
| JP | 10-98632 | 4/1998 |
| KR | 1998-0079108 | 11/1998 |

OTHER PUBLICATIONS

Korean Office Action dated May 29, 2006 of Korean Patent Application No. 10-2004-0081839.

* cited by examiner

*Primary Examiner*—Tuyet Thi Vo
(74) *Attorney, Agent, or Firm*—Stanzione & Kim, LLP

(57) ABSTRACT

A horizontal deflection circuit having a horizontal output transistor that receives an input horizontal driving signal and drives a horizontal deflection coil includes a current controlling unit to selectively perform an operation to decrease a base current applied to a base terminal of the horizontal output transistor, and a controlling unit to sense a frequency of the horizontal driving signal and to enable the operation of the current controlling unit when the sensed frequency of the horizontal driving signal is higher than a predetermined level. Accordingly, the horizontal deflection circuit can control the base current of the horizontal output transistor according to a frequency mode, thereby decreasing damage to the horizontal output transistor.

16 Claims, 2 Drawing Sheets

DEFLECTION CIRCUIT TO CONTROL BASE CURRENT OF OUTPUT TRANSISTOR

CROSS-REFERENCE TO RELATED APPLICATIONS

This application claims the benefit under 35 U.S.C § 119 of Korean Patent Application No. 2004-81839, filed on Oct. 13, 2004, in the Korean Intellectual Property Office, the disclosure of which is incorporated herein in its entirety by reference.

BACKGROUND OF THE INVENTION

1. Field of the Invention

The present general inventive concept relates to a horizontal deflection circuit, and more particularly, to a horizontal deflection circuit capable of controlling a base current of a horizontal output transistor according to a frequency mode, thereby decreasing damage to the horizontal output transistor.

2. Description of the Related Art

Generally, a cathode ray tube (CRT) used in an image displaying apparatus utilizes a principle that respective electron beams having different amounts beat monochrome or fluorescent materials of Red, Green and Blue (RGB) coated on a surface of the CRT according to different intensities of image signals, thereby producing lights different in brightness or color.

A CRT image displaying apparatus receives an image signal and a synchronous signal input from a video card of a computer system and displays information on a screen. The CRT image displaying apparatus comprises a video system to process image signals, a deflection system for vertical and horizontal deflection, and a power system.

FIG. 1 illustrates a conventional horizontal deflection circuit of a CRT image displaying apparatus.

Referring to FIG. 1, the conventional horizontal deflection circuit comprises a horizontal driving signal generating unit 100 generating a horizontal driving signal of a square wave based on a horizontal synchronous signal input from a microcomputer (not shown), a horizontal driving unit 200 amplifying the horizontal driving signal generated from the horizontal driving signal generating unit 100 to a predetermined level, and a horizontal output unit 300 generating a sawtooth wave current based on the horizontal driving signal amplified in the horizontal driving unit 200 and supplying the sawtooth wave current to a horizontal deflection coil (HD.Y').

The horizontal driving signal generating unit 100 signal-modulates the horizontal synchronous signal output from the microcomputer and then supplies the signal-modulated horizontal synchronous signal to the horizontal driving unit 200 as the horizontal driving signal.

The horizontal driving unit 200 comprises a buffer circuit 202 buffering the horizontal driving signal generated in the horizontal driving signal generating unit 100, a horizontal driving transistor Q1 being turned on or off according to the horizontal driving signal ouput from the buffer circuit 202, and a horizontal driving transformer HDT' accumulating energy therein according to the turning on or off of the horizontal driving transistor Q1.

The horizontal driving signal is supplied to a base terminal of the horizontal driving transistor Q1 through the buffer circuit 202. Then, the horizontal driving transistor Q1 is turned on in the on section of the horizontal driving signal, and the horizontal driving transformer HDT' thereby accumulates energy therein. The horizontal driving transistor Q1 is turned off in the off section of the horizontal driving signal, thereby transmitting the energy accumulated in the horizontal driving transformer HDT' to the horizontal output unit 300. Here, resistors R1 and R2 are used to control an amount of current.

The horizontal output unit 300 comprises a horizontal output transistor Q2, a damper diode D1, a return capacitor C1 and the horizontal deflection coil HD.Y'. The horizontal output transistor Q2 is turned on or off according to an intensity of the current output from the horizontal driving unit 200.

The horizontal output transistor Q2 is turned off while the horizontal driving transformer HDT' accumulates energy therein, and is turned on while the energy accumulated in the horizontal driving transformer HDT' is being transmitted to the horizontal output unit 300.

When the horizontal output transistor Q2 is turned on, B+ power current is supplied to the horizontal deflection coil HD.Y'.

However, when the horizontal output transistor Q2 is abruptly turned off, the current accumulated in the horizontal deflection coil HD.Y' is charged through the return capacitor C1. When the return capacitor C1 is completely charged, the voltage charged in the return capacitor C1 is again discharged into the horizontal deflection coil HD.Y' and subsequently the current is again accumulated in the horizontal deflection coil HD.Y'.

When energy is accumulated in the horizontal deflection coil HD.Y' to the degree that the voltage of the horizontal deflection coil HD.Y' applies a bias in a forward direction to the damper diode D1, the damper diode D1 is electrically conducted and the current flowing on the horizontal deflection coil HD.Y' is dropped to zero (0).

At the point of time when the current flowing on the horizontal deflection coil HD.Y' reaches zero (0), the horizontal output transistor Q2 is again turned on by the horizontal driving unit 200 and the steps described above are repeated.

Through these steps, as the sawtooth wave current is supplied to the horizontal deflection coil HD.Y', horizontal deflection is attained and horizontal scanning is made.

However, where two or more frequency modes including a DTV mode (28.1 kHz in a case of an European type) or a common RF mode (31.5 kHz) are simultaneously used in an image displaying apparatus having the conventional horizontal deflection coil, the current induced to a second side of the horizontal driving transformer HDT' increases as a higher horizontal frequency mode is input, thereby increasing the base current of the horizontal output transistor Q2. This causes heat to be generated from the horizontal output transistor Q2. In a case of excessive heat, the horizontal output transistor Q2 can be damaged.

SUMMARY OF THE INVENTION

Accordingly, the present general inventive concept provides a horizontal deflection circuit capable of controlling a base current of a horizontal output transistor according to a frequency mode, thereby decreasing damage to the horizontal output transistor.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a horizontal deflection circuit having a horizontal output transistor that receives an input horizontal driving signal and drives a horizontal deflection coil, the horizontal deflection circuit comprising a current controlling unit to selectively perform an operation to decrease a base current applied to a base terminal of the horizontal output transistor, and a controlling unit to sense a frequency of the horizontal driving signal and to enable the operation of the current controlling unit when the sensed frequency of the horizontal driving signal is higher than a predetermined level.

The horizontal deflection circuit may further comprise a horizontal driving transformer to amplify a current of the horizontal driving signal and to apply the current-amplified horizontal driving signal to the base terminal of the horizontal output transistor.

The current controlling unit may comprise at least one first resistor to decrease the current of the horizontal driving signal applied to the horizontal driving transformer, and a switching unit to be controlled by the controlling unit to turn on when the frequency of the horizontal driving signal is higher than the predetermined level, to thereby allow a predetermined portion of the current of the horizontal driving signal to be supplied to a ground through the first resistor.

The current controlling unit may further comprise a zener diode interposed between the first resistor and the switching unit.

The switching unit may comprise a transistor having a base terminal, and the current controlling unit may further comprise at least one second resistor connected to the base terminal of the transistor of the switching unit to control an amount of a current flowing on the base terminal connected thereto.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
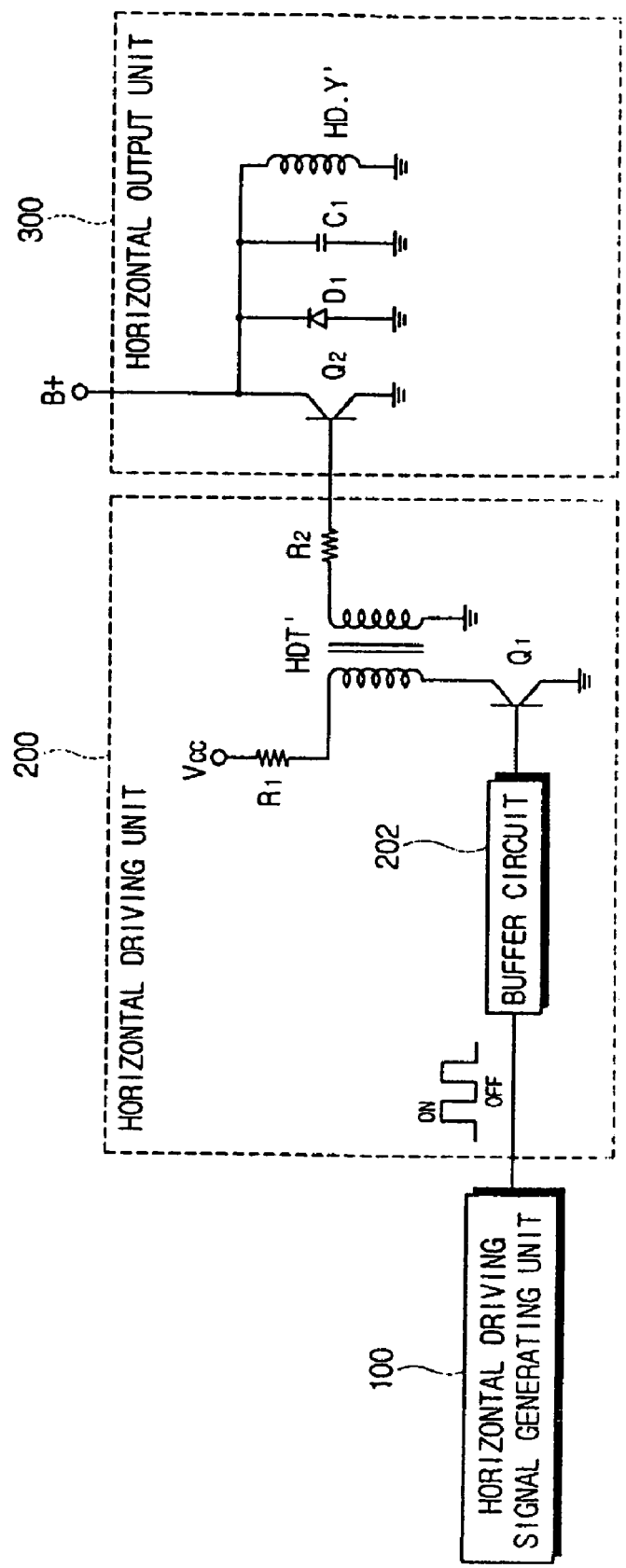
FIG. 1 is a diagram illustrating a conventional horizontal deflection circuit.

Reference will now be made in detail to the embodiment of the present general inventive concept, examples of which are illustrated in the accompanying drawings, wherein like reference numerals refer to the like elements throughout. The embodiment is described below in order to explain the present general inventive concept while referring to the figures.

Figure 2:
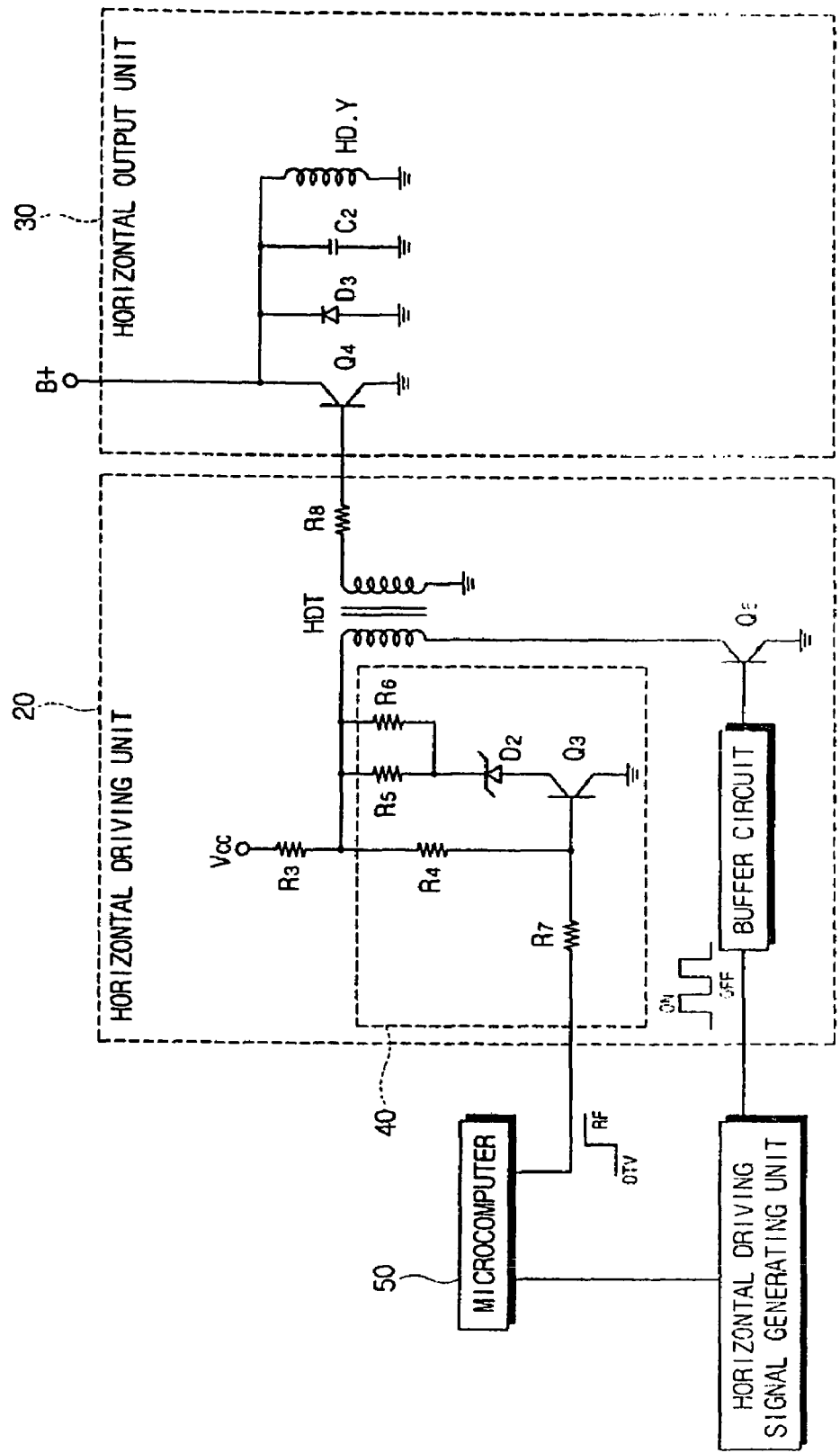
FIG. 2 is a diagram illustrating a horizontal deflection circuit according to an embodiment of the present general inventive concept.

FIG. 2 is a diagram illustrating a construction of a horizontal deflection circuit according to an embodiment of the present general inventive concept.

Referring to FIG. 2, the horizontal deflection circuit comprises a horizontal driving signal generating unit 10 to generate a horizontal driving signal of square wave based on a horizontal synchronous signal input from a microcomputer 50, a horizontal driving unit 20 to amplify the horizontal driving signal generated in the horizontal driving signal generating unit 10 to a predetermined level, a horizontal output unit 30 to generate a sawtooth wave current based on the horizontal driving signal amplified in the horizontal driving unit 20 and to supply the sawtooth wave current to a horizontal deflection coil HD.Y, a current controlling unit 40 to decrease a current amount of the horizontal driving signal output to the horizontal output unit 30, and the microcomputer 50 to sense a frequency of the horizontal driving signal and to control the current controlling unit 40 according to the sensed frequency.

The horizontal driving signal generating unit 10 signal-modulates the horizontal synchronous signal output from the microcomputer 50 to generate the horizontal driving signal and then supplies the horizontal driving signal to the horizontal driving unit 20.

The horizontal driving unit 20 comprises a buffer circuit 22 to buffer the horizontal driving signal generated from the horizontal driving signal generating unit 10, a horizontal driving transistor Q5 to turn on or off according to the horizontal driving signal output through the buffer circuit 22, and a horizontal driving transformer HDT to accumulate energy therein according to the on or off state of the horizontal driving transistor Q5.

The horizontal driving transistor Q5 is turned on or off according to the horizontal driving signal input into a base terminal thereof. That is, the horizontal driving transistor Q5 is turned on in the on section of the horizontal driving signal, thereby allowing energy to be accumulated in the horizontal driving transformer HDT, but is turned off in the off section of the horizontal driving signal, thereby allowing the energy accumulated in the horizontal driving transformer HDT to be transmitted to the horizontal output unit 30.

The horizontal driving transformer HDT includes a primary side, one terminal of which is connected to a power source (Vcc) through a resistor R3 for a voltage drop and another terminal of which is connected to a collector terminal of the horizontal driving transistor Q5, and a secondary side to receive current induced from the primary side, one terminal of which is connected to a resistor R8 to limit current and another terminal of which is connected to a ground.

The horizontal output unit 30 includes a horizontal output transistor Q4, a damper diode D3, a return capacitor C2 and the horizontal deflection coil HD.Y. The horizontal output transistor Q4 turns on or off according to an intensity of the current transmitted from the secondary side of the horizontal driving transformer HDT of the horizontal driving unit 20 through the resistor R8.

The horizontal output transistor Q4 is turned on while the horizontal driving transformer HDT is accumulating energy therein, but is turned off while the energy accumulated in the horizontal driving transformer HDT is being transmitted to the horizontal output unit 30.

When the horizontal output transistor Q4 is turned on, B+ power current is supplied to the horizontal deflection coil HD.Y. However, when the horizontal output transistor Q4 is abruptly turned off, the current accumulated in the horizontal deflection coil HD.Y is charged through the return capacitor C2. When the return capacitor C2 is completely charged, the voltage charged in the return capacitor C2 is again discharged into the horizontal deflection coil HD.Y and subsequently current is again accumulated in the horizontal deflection coil HD.Y When the energy is accumulated in the horizontal deflection coil HD.Y to the degree that the voltage of the horizontal deflection coil HD.Y applies a bias in a forward direction to the damper diode D3, the damper diode D3 is electrically conducted and the current flowing on the horizontal deflection coil HD.Y is dropped to zero (0).

At the point of time when the current flowing on the horizontal deflection coil HD.Y reaches zero (0), the horizontal output transistor Q4 is again turned on by the horizontal driving unit 20 and the operations described above are repeated.

Through the operations described above, as the sawtooth wave current is supplied to the horizontal deflection coil DH.Y, horizontal deflection is attained and horizontal scanning is made.

The current controlling unit 40 includes resistors R5 and R6 interconnected in parallel to the primary side of the horizontal driving transformer HDT, a zener diode D2 connected in series to the resistors R5 and R6, a transistor Q3 connected to an anode terminal of the zener diode D2, and resistors R4 and R7 connected to the base terminal of the transistor Q3.

The resistors R5 and R6 are constructed in parallel to compensate for temperature changes due to an increase of the current, and the zener diode D2 is added to the current controlling unit so as to produce a distribution effect according to an increase of the temperature.

The resistors R4 and R7 connected to the base terminal of the transistor Q3 are provided so as to supply an appropriate current to the base terminal of the transistor Q3.

The microcomputer 50 senses a frequency of the horizontal driving signal generated from the horizontal driving signal generating unit 10, turns on the transistor Q3 of the current controlling unit 40 when the sensed frequency is higher than a predetermined level, to thereby decrease a base current of the horizontal output transistor Q4, and turns off the transistor Q3 of the current controlling unit 40 when the sensed frequency is lower than the predetermined level, to thereby increase the base current of the horizontal output transistor Q4.

With this configuration, an operation of the horizontal deflection circuit according to an embodiment of the present general inventive concept will be described in a brief manner. For the sake of convenience, it will be assumed that a DTV mode is input to an image displaying apparatus having the horizontal deflection circuit, but the present general inventive concept is not limited thereto.

The horizontal driving signal generating unit 10 generates the horizontal driving signal having a frequency of 28.5 kHz corresponding to the DTV mode. The microcomputer 50 senses the frequency of the horizontal driving signal generated from the horizontal driving signal generating unit 10, determines that the sensed frequency is lower than the predetermined level, and generates a DTV mode control signal to turn off the transistor Q3 of the current controlling unit 40, to thereby disable the current controlling unit 40. The horizontal driving transistor Q5 repeats turn on or off operations according to the horizontal driving signal generated in the horizontal driving signal generating unit 10 to thereby drive the horizontal driving transformer HDT, and the current induced to the secondary side of the horizontal driving transformer HDT causes the horizontal output transistor Q4 of the horizontal output unit 30 to be operated through the resistor R8 to thereby supply the current to the deflection coil HD.Y In the on section of the horizontal driving transistor Q5, the power source Vcc whose voltage is dropped due to the resistor R3 is supplied to the primary side of the horizontal driving transformer HDT. In the off section of the horizontal driving transistor Q5, the current is induced to the secondary side of the horizontal driving transformer HDT and then transmitted to the base terminal of the horizontal output transistor Q4.

Here, the resistors R3 and R8 may have resistance values that can minimize a power loss of the horizontal output transistor Q4.

Later, when an input is changed to be an RF mode, the horizontal driving signal generating unit 10 generates a horizontal driving signal according to the changed frequency. The microcomputer 50 senses the frequency of the horizontal driving signal and generates an RF mode control signal to turn on the transistor Q3 of the current controlling unit 40. At this time, power supplied by the power source Vcc flowing through the resistors R3 and R4 is input into the base terminal of the transistor Q3, along with a current value output from the microcomputer 50, to thereby allow the transistor Q3 to be smoothly switched.

When the transistor Q3 is turned on, the current flowing from the power source Vcc is supplied to the ground through the resistors R5 and R6 interconnected in parallel and the zener diode D2 and the transistor Q3 of the current controlling unit 40. Accordingly, the amount of the current applied to the primary side of the horizontal driving transformer HDT is decreased and the base current of the horizontal output transistor Q4 is accordingly decreased.

As described above, a frequency is sensed by the microcomputer 50, but the present general inventive concept is not limited thereto. For example, an IC to sense a change in frequency can be separately provided.

In the present general inventive concept as described above, by allowing the current to be selectively divided through resistors and a zener diode, stress from temperature and damage to components of the horizontal output transistor can be prevented.

As described above, a horizontal deflection circuit according to the present general inventive concept is capable of decreasing damage to a horizontal output transistor by controlling a base current of the horizontal output transistor according to the frequency mode.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A horizontal deflection circuit having a horizontal output transistor that receives an input horizontal driving signal and drives a horizontal deflection coil, comprising:
    a current controlling unit to selectively perform an operation to decrease a base current applied to a base terminal of the horizontal output transistor; and
    a controlling unit to sense a frequency of the horizontal driving signal and to enable the operation of the current controlling unit when the sensed frequency of the horizontal driving signal is higher than a predetermined level,
    wherein the controlling unit comprises a switching unit to be controlled to supply a portion of the current of the horizontal driving signal to a ground according to the frequency of the horizontal driving signal with respect to a predetermined level.

2. The horizontal deflection circuit as claimed in claim 1, further comprising a horizontal driving transformer to amplify the horizontal driving signal and to apply the amplified horizontal driving signal to the base terminal of
the horizontal output transistor as the base current.

3. The horizontal deflection circuit as claimed in claim 2, wherein the current controlling unit comprises:
a first resistor through which the predetermined portion of the current of the horizontal driving signal is supplied to the ground to decrease a current amount of the horizontal driving signal applied to the horizontal driving transformer; and
the switching unit is turned on when the frequency of the horizontal driving signal is higher than the predetermined level, so that a predetermined portion of the current of the horizontal driving signal is supplied to a ground through the first resistor.

4. The horizontal deflection circuit as claimed in claim 3, wherein the current controlling unit further comprises a zener diode interposed between the first resistor and the switching unit.

5. The horizontal deflection circuit as claimed in claim 4, wherein the switching unit comprises a transistor having a base terminal; and
the current controlling unit further comprises at least one second resistor connected to the base terminal of the transistor of the switching unit to control the amount of current supplied to the base terminal connected thereto.

6. The horizontal deflection circuit as claimed in claim 1, wherein the frequency of the horizontal driving signal is a frequency representing one of a DTV mode and an RF mode.

7. A display apparatus, comprising:
a horizontal driving signal generating unit to generate a horizontal driving signal according to an input signal;
a horizontal driving unit to amplify the horizontal driving signal generated by the horizontal driving signal generating unit;
a horizontal output unit to generate a deflection signal based on the horizontal driving signal and to supply the deflection signal to a horizontal deflection coil provided therein;
a current controlling unit to control a current of the amplified horizontal driving signal; and
a controlling unit to sense a frequency of the input signal and to control the current controlling unit according to the sensed frequency.

8. The display apparatus as claimed in claim 7, wherein the frequency of the input signal comprises a frequency of a horizontal synchronous signal of the input signal.

9. The display apparatus as claimed in claim 7, wherein the horizontal driving unit comprises:
a power source;
a buffer circuit to buffer the horizontal driving signal generated by the horizontal driving signal generating unit;
a horizontal driving transistor to turn on and off according to the buffered horizontal driving signal; and
a horizontal driving transformer including a primary side having a first terminal connected to the power source to supply voltage to the primary side and a second terminal connected to the horizontal driving transistor, and a secondary side to receive a current induced from the primary side and transmit the induced current to the horizontal output unit.

10. The display apparatus as claimed in claim 9, wherein the current controlling unit comprises:
one or more resistors connected to the power source and interconnected in parallel to the first terminal of the primary side of the horizontal driving transformer;
a zener diode connected in series to the plurality of resistors; and
a current controlling transistor connected to an anode terminal of the zener diode to be turned on and off by the controlling unit according to the sensed frequency.

11. The display apparatus as claimed in claim 10, wherein when the current controlling transistor is turned on by the controlling unit, the voltage supplied by the power source is divided between the one or more resistors and the first terminal of the primary side of the horizontal driving transformer to reduce the voltage supplied to the primary side of the horizontal driving transformer and to reduce the induced current received by the secondary side of the horizontal driving transformer and transmitted to the horizontal output unit.

12. The display apparatus as claimed in claim 11, wherein when the current controlling transistor is turned off by the controlling unit, the current controlling unit does not affect the voltage supplied to the primary side of the horizontal driving transformer.

13. The display apparatus as claimed in claim 10, wherein the controlling unit turns on the current controlling transistor when the sensed frequency is larger than a predetermined frequency, and turns off the current controlling unit when the sensed frequency is smaller than the predetermined frequency.

14. The display apparatus as claimed in claim 13, wherein the frequency of the horizontal driving signal represents one of a DTV mode and an RF mode.

15. The display apparatus as claimed in claim 7, wherein when the sensed frequency is larger than a predetermined frequency, the controlling unit controls the current controlling unit to decrease the current of the amplified horizontal driving signal.

16. A display apparatus, comprising:
a driving signal generating unit to generate a driving signal according to an input signal;
a driving unit to amplify the driving signal;
an output unit to generate a deflection signal based on the amplified driving signal and to supply the deflection signal to a deflection coil provided therein;
a current controlling unit to control a current of the amplified driving signal; and
a controlling unit to determine a frequency of the input signal and to control the current controlling unit to control the current of the amplified driving signal according to the determined frequency of the input signal.

* * * * *